(12) United States Patent
Proejts et al.

(10) Patent No.: US 11,664,864 B2
(45) Date of Patent: *May 30, 2023

(54) SYSTEM AND METHOD FOR ANTENNA REDUCTION AND USAGE FOR A MULTI-RADIO INFORMATION HANDLING SYSTEM

(71) Applicant: Dell Products, LP, Round Rock, TX (US)

(72) Inventors: Lars Fredrik Proejts, Taipei (TW); Suresh K. Ramasamy, Cedar Park, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/683,093

(22) Filed: Feb. 28, 2022

(65) Prior Publication Data

US 2022/0329298 A1 Oct. 13, 2022

Related U.S. Application Data

(63) Continuation of application No. 17/229,532, filed on Apr. 13, 2021, now Pat. No. 11,265,052.

(51) Int. Cl.
*H04B 7/0413* (2017.01)
*H04B 7/06* (2006.01)
*H04B 7/08* (2006.01)
*H04B 1/44* (2006.01)

(52) U.S. Cl.
CPC ............ *H04B 7/0602* (2013.01); *H04B 1/44* (2013.01); *H04B 7/0413* (2013.01); *H04B 7/0897* (2013.01)

(58) Field of Classification Search
CPC .... H04B 7/0602; H04B 1/044; H04B 7/0413; H04B 7/0897; H04B 1/44
See application file for complete search history.

(56) References Cited

U.S. PATENT DOCUMENTS

| | | | |
|---|---|---|---|
| 6,816,711 | B2 | 11/2004 | Standke |
| 7,369,085 | B1 | 5/2008 | Jacomb-Hood |
| 8,644,197 | B2 | 2/2014 | Lee |
| 8,817,672 | B2 | 8/2014 | Corman |

(Continued)

*Primary Examiner* — Rahel Guarino
(74) *Attorney, Agent, or Firm* — Prol Intellectual Property Law, PLLC; H. Kenneth Prol

(57) ABSTRACT

An information handling system includes a processor, a memory, and a wireless interface adapter for transceiving wireless communications via radiofrequency (RF) waves, a plurality of antennas operatively coupled to the wireless interface adapter, including a first antenna operatively coupled to a first wireless protocol subsystem, a second antenna operatively coupled to a second wireless protocol subsystem, and a shared antenna, an RF switch configured to operatively switch the shared antenna between the first wireless protocol subsystem and the second wireless protocol subsystem, and an antenna controller operatively coupled to the RF switch to receive status information of the status of the first wireless protocol subsystem to determine assignment of the shared antenna, and to switch the RF switch to operatively couple the shared antenna to the first wireless protocol subsystem when it is determined to be active.

20 Claims, 6 Drawing Sheets

(56) References Cited

U.S. PATENT DOCUMENTS

| | | |
|---|---|---|
| 9,391,762 B2 | 7/2016 | Rousu |
| 9,438,278 B2 | 9/2016 | Barker |
| 9,484,961 B2 | 11/2016 | Lum |
| 9,807,777 B2 | 10/2017 | Kim |
| 10,098,018 B2 | 10/2018 | Lysejko |
| 10,116,051 B2 | 10/2018 | Scarborough |
| 10,721,749 B2 | 7/2020 | Park |
| 11,265,052 B1 * | 3/2022 | Proejts ................. H04B 7/0413 |
| 2009/0258607 A1 | 10/2009 | Beninghaus |
| 2015/0181469 A1 | 6/2015 | Yu |
| 2017/0163293 A1 * | 6/2017 | Lee ...................... H04B 1/0057 |

* cited by examiner

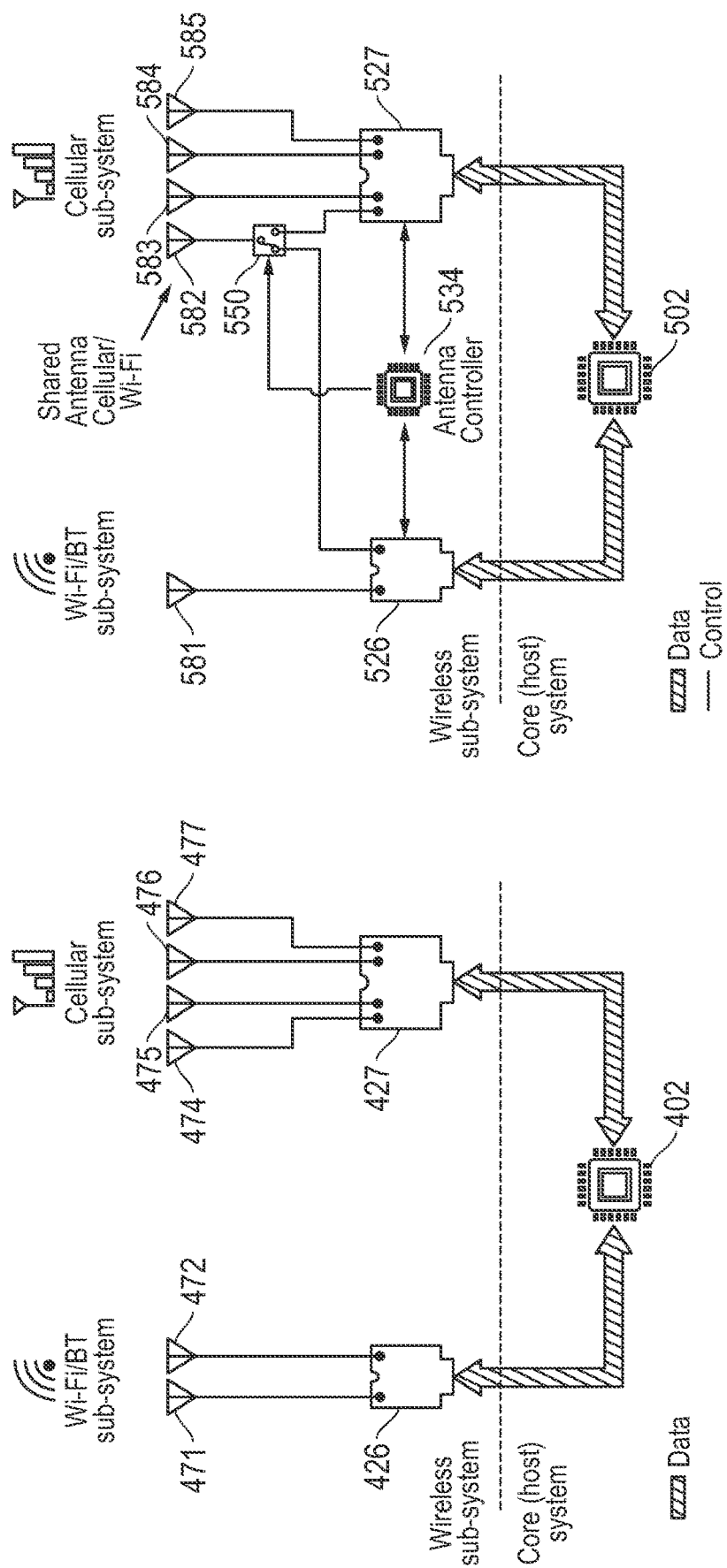

SYSTEM AND METHOD FOR ANTENNA REDUCTION AND USAGE FOR A MULTI-RADIO INFORMATION HANDLING SYSTEM

This application is a continuation of prior application Ser. No. 17/229,532, entitled "SYSTEM AND METHOD FOR ANTENNA REDUCTION AND USAGE FOR A MULTI-RADIO INFORMATION HANDLING SYSTEM," filed on Apr. 13, 2021, which is assigned to the current assignee hereof and is incorporated herein by reference in its entirety.

FIELD OF THE DISCLOSURE

The present disclosure generally relates to information handling systems, and more particularly relates to an information handling system including plural antenna systems co-located on a multi-radio information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. The information handling system may also include telecommunication, network communication, and video communication capabilities. Information handling system chassis parts may include case portions such as for a laptop information handling system including covers, such as an A-cover, B-cover, C-cover and D-cover over components and in part designed with a metal structure. The information handling system may be configurable with one or more antenna systems co-located within a base chassis or display chassis and communicating via one or more wireless protocols.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 4 is a block diagram of plural antennas and wireless sub-systems according to a prior art layout design;

FIG. 5 is a block diagram of plural antennas, antenna controller, and wireless sub-systems according to an embodiment of the present disclosure;

The use of the same reference symbols in different drawings may indicate similar or identical items.

DETAILED DESCRIPTION OF THE DRAWINGS

Figure 1:
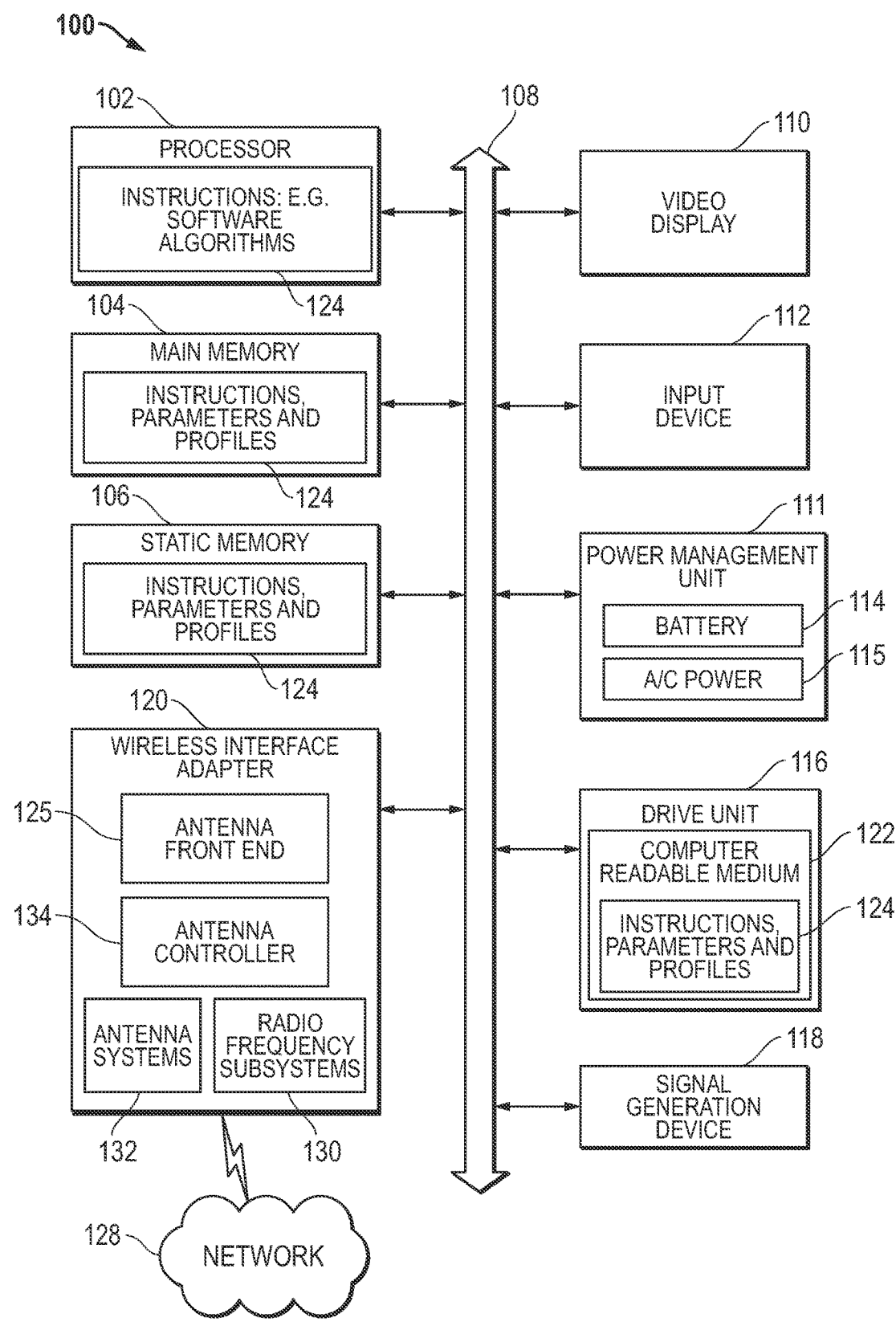
FIG. 1 illustrates an embodiment of information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

For aesthetic, strength, and performance reasons, information handling system chassis parts may be more commonly designed with a metal structure. In an embodiment, a laptop information handling system, for example, may include a plurality of covers for the interior components of the information handling system. In these embodiments, a form factor case may include an "A-cover" which serves as a back cover for a display housing and a "B-cover" which may serve as the bezel, if any, and a display screen of the convertible laptop information handling system in an embodiment. In a further example, the laptop information handling system case may include a "C-cover" housing a keyboard, touchpad, speaker, and any cover in which these components are set and a "D-cover" base housing for the laptop information handling system.

With the need for utility of lighter, thinner, and more streamlined devices, the use of full metal portions for the outer covers of the display and base housing (e.g. the A-cover and the D-cover) is desirable for strength as well as aesthetic reasons. At the same time, the demands for wireless operation also increase. This includes addition of many simultaneously operating radiofrequency (RF) systems, addition of more antennas, and utilization of various antenna types. Space available within the display and base housing, in view of the metal structures used, is less available and more difficult to accommodate in information handling systems. This is particularly true with the expanding number of antennas and antenna system used in wireless communications for information handling systems. In the present specification and in the appended claims, the term "radio frequency" is meant to be understood as the oscillation rate of an electromagnetic wave. A specific frequency of an electromagnetic wave may have a wavelength that is equal to the speed of light (~300,000 km/s) divided by the frequency.

With new types of networks being developed such as 5G networks, additional antennas that operate on frequencies related to those 5G networks (i.e., high frequency (HF) band, very high frequency (VHF) band, ultra-high frequency (UHF) band, L band, S band, C band, X band, Ku band, K band, Ka band, V band, W band, and millimeter wave bands). So as to communicate with the existing networks as well as the newly developed networks, additional antennas may be added to an information handling system. However, the thinner and more streamlined devices have fewer locations and area available for mounting RF transmitters on these mobile information handling systems. One location within the information handling system where these RF systems and antennas are being pushed out of the A-cover and B-covers. This may lead to placing the RF systems and antennas in the C-cover or D-cover of the information handling systems.

Another consequence of using metal covers is the excitation of the metal surfaces of the covers described herein. This excitation of the metal surfaces leads to destructive interference in the signals sent by the antenna systems. Thus, a streamlined, full metal chassis capable of meeting the increasing wireless operation demands is needed. With multiple antennas that may operate in similar radio frequency ranges for differing wireless protocols, sharing of antenna systems is possible between wireless protocols thus reducing the number of antennas needed to be formed within the C-cover and D-cover of the base chassis or in the display chassis.

Some information handling systems would address these competing needs by providing for antennas for each of the RF transmitters/receivers of wireless subsystems for various wireless protocols used. The number of antennas becomes increasingly crowded in design and placement on the chassis. However, not all antennas or all protocols may be used simultaneously in many circumstances. Often, the wireless subsystems are present as available alternatives in various locations or with available wireless access points. Additionally, some antennas may be used as additional bandwidth for multiple input, multiple output (MIMO) or aggregated wireless communications which may not be necessary if other wireless systems are available. With multiple antennas that may operate in similar radio frequency ranges for differing wireless protocols, sharing of antenna systems is possible between wireless protocols thus reducing the number of antennas needed to be formed within the C-cover and D-cover of the base chassis or in the display chassis. A control system of the present embodiments may be established with an antenna controller and one or more radio frequency (RF) switches to switch between RF transmitters/receivers of different wireless subsystems for use with one or more shared antennas.

Embodiments of the present disclosure may decrease the complexity and cost of creating a chassis for information handling systems with multiple RF antennas by forming fewer antennas in the display or bases chassis. The co-location of shared antennas switchable with an antenna controller and antenna control system may thereby decreasing the size of the information handling system or reduce space occupied by plural antenna systems.

The transmitting antennas of embodiments of the present disclosure may include one or more antennas or a portion of antennas shared among two or more wireless sub-systems such as a Wi-Fi wireless subsystem and a cellular wireless subsystem. In embodiments of the present disclosure, an antenna controller may control an RF switch operatively coupled to portion of the antenna element or antenna elements that may be associated with both a first wireless protocol subsystem and a second wireless protocol subsystem. Such a method of control of the antenna element may include the integration of the antenna controller and an RF switch between the antenna element and either of the wireless protocol subsystems.

In some embodiments, the antenna controller may determine which wireless protocol is actively operating by the information handling system and then switch the RF switch to engage a shared antenna element with the operating wireless protocol. This may reduce the MIMO capability, for example, of another wireless protocol but may not entirely eliminate utilization of such a wireless protocol. For example, Wi-Fi may not always be available for a mobile information handling system such as a laptop. If Wi-Fi is not available, an antenna controller may detect such as state and execute an RF switch to enable one or more shared antenna elements to operate with a cellular wireless subsystem in an embodiment. For example, four antenna elements may be available to the cellular subsystem and provide for 4×4 MIMO connectivity. In another embodiment, if Wi-Fi is detected as available or operational, the antenna controller may allocate one or more shared antennas via the RF switch to the Wi-Fi wireless subsystem to enable Wi-Fi communications (e.g., 2×2 MIMO Wi-Fi communications). Remaining antennas may still provide for some portion cellular wireless subsystem communication (e.g., 2×2 MIMO cellular communications). The shared antenna elements may then effectively transmit communications signals depending on the wireless conditions determined by the antenna controller.

In embodiments described herein, the antenna element may be excited using a wireless interface adapter that includes an antenna front end. The antenna front end may, in the embodiments presented herein, be operatively coupled to one or more antenna elements to excite the antenna element in order to cause the antenna element to emit one or a plurality of frequencies based on the target frequency or a plurality of target frequencies for the wireless protocol being utilized.

Examples are set forth below with respect to particular aspects of an information handling system including case portions such as for a laptop information handling system including the chassis components designed with a fully metal structure and configurable such that the information handling system may operate with any of several wireless protocol subsystems.

FIG. 1 shows an information handling system 100 capable of administering each of the specific embodiments of the present disclosure. The information handling system 100, in an embodiment, can represent the mobile information handling systems 210, 220, and 230 or servers or systems located anywhere within network 200 described in connection with FIG. 2 herein, including the remote data centers operating virtual machine applications. Information handling system 100 may represent a mobile information handling system associated with a user or recipient of intended wireless communication. A mobile information handling system may execute instructions via a processor such as a central processing unit (CPU) or a microcontroller unit (MCU) operating both firmware instructions or hardwired instructions for the antenna controller 134 to achieve WLAN or WWAN antenna reconfiguration according to embodiments disclosed herein. The application programs operating on the information handling system 100 may communicate or otherwise operate via concurrent wireless links, individual wireless links, or combinations over any available radio access technology (RAT) protocols including WLAN and WWAN protocols. These application programs may operate in some example embodiments as software, in whole or in part, on an information handling system while other portions of the software applications may operate on remote server systems. The antenna controller 134 of the presently disclosed embodiments may operate as firmware or hardwired circuitry or any combination on controllers or processors within the information handling system 100 for interface with components of a wireless interface adapter 120 and one or more antenna systems 132. It is understood that some aspects of the antenna controller 134 described herein may interface or operate as software or via other controllers associated with the wireless interface adapter 120 or elsewhere within information handling system 100. In an embodiment, the antenna controller 134 may control an RF switch operatively coupling a shared antenna element co-located with other antenna elements of plural antenna systems 132 formed within the chassis of the information handling system as described herein. The antenna controller 134 may, in the embodiments presented herein, operatively couple a wireless RF subsystem 130 for one or more wireless protocols to the antenna element to excite the antenna element and dynamically switch between wireless protocols to be operated on the antenna element. In order to switch between RF wireless subsystems 130 to be operated at the antenna element, the antenna controller 134 may interface with and control circuitry of an RF switch. The RF switch may be used to toggle between wireless communications of different radio wireless protocol technologies transceived by a shared antenna element in an embodiment. The RF switch may be a dual throw RF switch in an example embodiment which may be operable on a motherboard to switch an antenna element trace between radios of different wireless protocols. Such a location of the RF switch may reduce loss for transmission along the traces in one example embodiment. In another embodiment, the antenna elements may be operatively coupled via coaxial cables or other electrical connection. The antenna controller 134 may be communicatively coupled to one or more RF switches for switching one or more shared antenna systems. The RF switch may include a single pole, double throw RF switch in one example embodiment.

Information handling system 100 may also represent a networked server or other system from which some software applications are administered or which wireless communications such as across WLAN or WWAN may be conducted. In other aspects, networked servers or systems may operate the antenna controller 134 for use with a wireless interface adapter 120 on those devices similar to embodiments for WLAN or WWAN antenna reconfiguration operation according to according to various embodiments.

The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a video display unit 110, such as a liquid crystal display (LCD), an organic light emitting diode (OLED), a flat panel display, or a solid-state display. Display 110 may include a touch screen display module and touch screen controller (not shown) for receiving user inputs to the information handling system 100. Touch screen display module may detect touch or proximity to a display screen by detecting capacitance changes in the display screen. Additionally, the information handling system 100 may include an input device 112, such as a keyboard, and a cursor control device, such as a mouse or touchpad or similar peripheral input device. The information handling system may include a power management unit 111 with a power source such as battery 114 or an A/C power source 115. The information handling system 100 can also include a disk drive unit 116, and a signal generation device 118, such as a speaker or remote control. The information handling system 100 can include a network interface device such as a wireless interface adapter 120. The information handling system 100 can also represent a server device whose resources can be shared by multiple client devices, or it can represent an individual client device, such as a desktop personal computer, a laptop computer, a tablet computer, a wearable computing device, or a mobile smart phone.

The information handling system 100 can include sets of instructions 124 that can be executed to cause the computer system to perform any one or more desired applications. In many aspects, sets of instructions 124 may implement wireless communications via one or more antenna systems 132 available on information handling system 100. In embodiments presented herein, the sets of instructions 124 may implement wireless communications via one or more antenna systems 132 as switched among one or more RF wireless subsystems 130 formed as part of a laptop-type information handling system. Operation of WLAN and WWAN wireless communications may be enhanced or otherwise improved via WLAN or WWAN antenna switching adjustments via the methods or controller-based functions relating to the antenna controller 134 disclosed herein. For example, instructions or a controller may execute software or firmware applications or algorithms which utilize one or more wireless links for wireless communications via the wireless interface adapter as well as other aspects or components. The antenna controller 134 may execute instructions as disclosed herein for monitoring wireless link state information including active or available wireless protocol access points for supported wireless protocol radio systems. Also, antenna controller 134 may monitor information handling system configuration data, SAR proximity sensor detection, or other system data to determine activation states or potential availability of one or more wireless protocols or antenna systems 132. The term "antenna system" described herein is meant to be understood as any object that emits a RF (RF) electromagnetic (EM) wave therefrom. According to some embodiments described herein an "antenna system" includes any antenna element, slot, other antenna structure or portions thereof operating to transmit or receive wireless signals as described herein.

The antenna controller 134 may implement adjustments to select wireless antenna systems and resources via a radio frequency integrated circuit (RFIC) front end 125 and WLAN or WWAN radio module systems within the wireless interface device 120. Aspects of the antenna reconfiguration for the antenna controller 134 may be included as part of an antenna front end 125 in some aspects or may be included with other aspects of the wireless interface device 120 such as WLAN radio module such as a Wi-Fi subsystem or a WWAN radio module such as a cellular subsystem that is part of the radio frequency (RF) subsystems 130. The antenna controller 134 described in the present disclosure and operating as firmware or hardware (or in some parts software) may switch to or adjust one or more of a plurality of antenna systems 132 via selecting subsystem 130 to be coupled to the one or more shared antenna systems 132 in various embodiments.

Multiple WLAN or WWAN antenna systems may operate on various communication frequency bands such as under IEEE 802.11a and IEEE 802.11g (i.e., medium frequency (MF) band, high frequency (HF) band, very high frequency (VHF) band, ultra-high frequency (UHF) band, L band, S band, C band, X band, Ku band, K band, Ka band, V band, W band, and millimeter wave bands) providing multiple band options for frequency channels. Further antenna radiation patterns and selection of shared antenna system options or power levels may be adapted due physical proximity of other antenna systems, of a user with potential SAR exposure, or improvement of RF channel operation according to received signal strength indicator (RSSI), signal to noise ratio (SNR), bit error rate (BER), modulation and coding scheme index values (MCS), or data throughput indications among other factors. In some aspects WWAN or WLAN antenna controller may execute firmware algorithms or hardware to regulate operation of the RF switching among one or more antenna systems 132 to various WWAN or WLAN RF subsystems 130 in the information handling system 100 to avoid poor wireless link performance due to poor reception, poor MCS levels of data bandwidth available, or poor indication of throughput due to indications of low RSSI, low power levels available (such as due to SAR), inefficient radiation patterns among other potential effects on wireless link channels used in some embodiments.

Various software modules comprising software application instructions 124 or firmware instructions may be coordinated by an operating system (OS) and via an application programming interface (API). An example operating system may include Windows®, Android®, and other OS types known in the art. Example APIs may include Win 32®, Core Java® API, Android® APIs, or wireless interface adapter driver API. In a further example, processor 102 may conduct processing of mobile information handling system applications by the information handling system 100 according to the systems and methods disclosed herein which may utilize wireless communications. The computer system 100 may operate as a standalone device or may be connected such as using a network, to other computer systems or peripheral devices. In other aspects, additional processor or control logic may be implemented in graphical processor units (GPUs) or controllers located with radio modules or within a wireless interface adapter 120 to implement method embodiments of the antenna controller and antenna reconfiguration according to embodiments herein. Code instructions 124 in firmware, hardware or some combination may be executed to implement operations of the antenna controller and antenna reconfiguration on control logic or processor systems such as antenna controller 134 or other controllers within the wireless interface adapter 120 for example.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a PDA, a mobile information handling system, a tablet computer, a laptop computer, a desktop computer, a communications device, a wireless smart phone, wearable computing devices, a control system, a camera, a scanner, a printer, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 may include a computer-readable medium 122 in which one or more sets of instructions 124 such as software can be embedded. Similarly, main memory 104 and static memory 106 may also contain computer-readable medium for storage of one or more sets of instructions, parameters, or profiles 124. The disk drive unit 116 and static memory 106 also contains space for data storage. Some memory or storage may reside in the wireless interface adapter 120. Further, the instructions 124 that embody one or more of the methods or logic as described herein. For example, instructions relating to the WWAN or WLAN antenna reconfiguration system or antenna switching adjustments described in embodiments herein may be stored here or transmitted to local memory located with the antenna controller 134, antenna front end 125, or wireless module in RF subsystem 130 in the wireless interface adapter 120.

In a particular embodiment, the instructions, parameters, and profiles 124 may reside completely, or at least partially, within a memory, such as non-volatile static memory, during execution of antenna switching by the antenna controller 134 in wireless interface adapter 132 of information handling system 100. As explained, some or all of the WWAN or WLAN antenna switching selection and antenna reconfiguration may be executed locally at the antenna controller 134, RF front end 125, or wireless module subsystem 130. Some aspects may operate remotely among those portions of the wireless interface adapter or with the main memory 104 and the processor 102 in parts including the computer-readable media in some embodiments.

The network interface device shown as wireless interface adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless interface adapter 120 may include one or more RF subsystems 130 with transmitter/receiver circuitry, modem circuitry, one or more unified antenna front end circuits 125, one or more wireless controller circuits such as antenna controller 134, amplifiers, antenna systems 132 and other radio frequency (RF) subsystem circuitry 130 for wireless communications via multiple radio access technologies. Each RF subsystem 130 may communicate using one or more wireless technology protocols. The RF subsystem 130 may contain individual subscriber identity module (SIM) profiles for each technology service provider and their available protocols for subscriber-based radio access technologies such as cellular LTE communications. The wireless interface adapter 120 may also include antenna systems 132 which may be tunable antenna systems or may include an antenna adaptation network for use with the system and methods disclosed herein to optimize antenna system operation. Additional antenna system adaptation network circuitry (not shown) may also be included with the wireless interface adapter 120 to implement WLAN or WWAN modification measures for shared antenna systems 132 and other antenna systems 132 as described in various embodiments of the present disclosure.

In some aspects of the present disclosure, a wireless interface adapter 120 may operate two or more wireless links. In a further aspect, the wireless interface adapter 120 may operate the two or more wireless links with a single, shared communication frequency band such as with a Wi-Fi WLAN operation or 5G LTE standard WWAN operations in an example aspect. For example, a 5 GHz wireless communication frequency band may be apportioned under the 5G standards for communication on either small cell WWAN wireless link operation or Wi-Fi WLAN operation as well as other wireless activity in LTE, WiFi, WiGig, Bluetooth, or other communication protocols. In some embodiments, the shared, wireless communication bands may be transmitted through one or a plurality of antennas. In an embodiment, the shared, wireless communication bands may be transmitted through one or a plurality of antennas, some of which may be switchable shared antennas, as described herein. Other communication frequency bands are contemplated for use with the embodiments of the present disclosure as well.

In other aspects, the information handling system 100 operating as a mobile information handling system may operate a plurality of wireless interface adapters 120 or a plurality of RF subsystems 130 for concurrent radio operation in one or more wireless communication bands. The plurality of wireless interface adapters 120 or a plurality of RF subsystems 130 may further operate in nearby wireless communication bands in some disclosed embodiments. Further, harmonics, environmental wireless conditions, and other effects may impact wireless link operation when a plurality of wireless links are operating as in some of the presently described embodiments. The series of potential effects on wireless link operation may cause an assessment of the wireless interface adapters 120 to potentially make antenna system selection adjustments according to the WWAN or WLAN antenna control system of the present disclosure.

The wireless interface adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless interface adapter 120 and antenna controller 134 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both license and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band in example embodiments. WLAN, for example, may also operate at a 2.4 GHz band. WWAN may operate in a number of bands, some of which are propriety but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. In the example embodiment, mobile information handling system 100 includes both unlicensed wireless RF communication capabilities as well as licensed wireless RF communication capabilities. For example, licensed wireless RF communication capabilities may be available via a subscriber carrier wireless service. With the licensed wireless RF communication capability, WWAN RF front end may operate on a licensed WWAN wireless radio with authorization for subscriber access to a wireless service provider on a carrier licensed frequency band. With the advent of 5G networks, any number of protocols may be implemented including global system for mobile communications (GSM) protocols, general packet radio service (GPRS) protocols, enhanced data rates for GSM evolution (EDGE) protocols, code-division multiple access (CDMA) protocols, universal mobile telecommunications system (UMTS) protocols, long term evolution (LTE) protocols, long term evolution advanced (LTE-A) protocols, WiMAX, LTE, and LTE Advanced, LTE-LAA, small cell WWAN and IP multimedia core network subsystem (IMS) protocols, for example, and any other communications protocols suitable for the method(s), system(s) and device(s) described herein, including any proprietary protocols. The protocols implemented may operate on certain 5G frequencies such as high frequency (HF) bands, very high frequency (VHF) bands, ultra-high frequency (UHF) bands, L band, S band, C band, X band, Ku band, K band, Ka band, V band, W band, and millimeter wave bands, among others.

The wireless interface adapter 120 can represent an add-in card, wireless network interface module that is integrated with a main board of the information handling system or integrated with another wireless network interface capability, or any combination thereof. In an embodiment the wireless interface adapter 120 may include one or more RF subsystems 130 including transmitters and wireless controllers such as wireless module subsystems for connecting via a multitude of wireless links under a variety of protocols. In an example embodiment, an information handling system may have an antenna system transmitter 132 for 5G small cell WWAN, Wi-Fi WLAN or WiGig connectivity and one or more additional antenna system transmitters 132 for macro-cellular communication. The RF subsystems 130 include wireless controllers to manage authentication, connectivity, communications, power levels for transmission, buffering, error correction, baseband processing, and other functions of the wireless interface adapter 120 for one or more wireless protocols.

The RF subsystems 130 of the wireless interface adapters may also measure various metrics relating to wireless communication pursuant to operation of an antenna system 132 as in the present disclosure. For example, the wireless controller of a RF subsystem 130 may manage detecting and measuring received signal strength levels, bit error rates, signal to noise ratios, latencies, power delay profile, delay spread, and other metrics relating to signal quality and strength. Such detected and measured aspects of wireless links, such as WWAN or WLAN links operating on one or more antenna systems 132, may be used by the antenna controller 134 to reconfigure any portion of the antenna systems 132 according to various embodiments herein. In another embodiment, a wireless controller of a wireless interface adapter 120 may manage one or more RF subsystems 130. The wireless controller also manages transmission power levels which directly affect RF subsystem power consumption as well as transmission power levels from the plurality of antenna systems 132. The transmission power levels from the antenna systems 132 may be relevant to specific absorption rate (SAR) safety limitations for transmitting mobile information handling systems. To control and measure power consumption via a RF subsystem 130, the RF subsystem 130 may control and measure current and voltage power that is directed to operate one or more antenna systems 132.

The wireless network may have a wireless mesh architecture in accordance with mesh networks described by the wireless data communications standards or similar standards in some embodiments but not necessarily in all embodiments. The wireless interface adapter 120 may also connect to the external network via a WPAN, WLAN, WWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the network 128. Further, the instructions 124 may be transmitted or received over the network 128 via the network interface device or wireless interface adapter 120.

Information handling system 100 includes one or more application programs 124, and Basic Input/Output System and firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in drive 116, in a ROM (not illustrated) associated with information handling system 100, in an option-ROM (not illustrated) associated with various devices of information handling system 100, in storage system 107, in a storage system (not illustrated) associated with network channel of a wireless interface adapter 120, in another storage medium of information handling system 100, or a combination thereof. Application programs 124 and BIOS/FW code 124 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Figure 2:
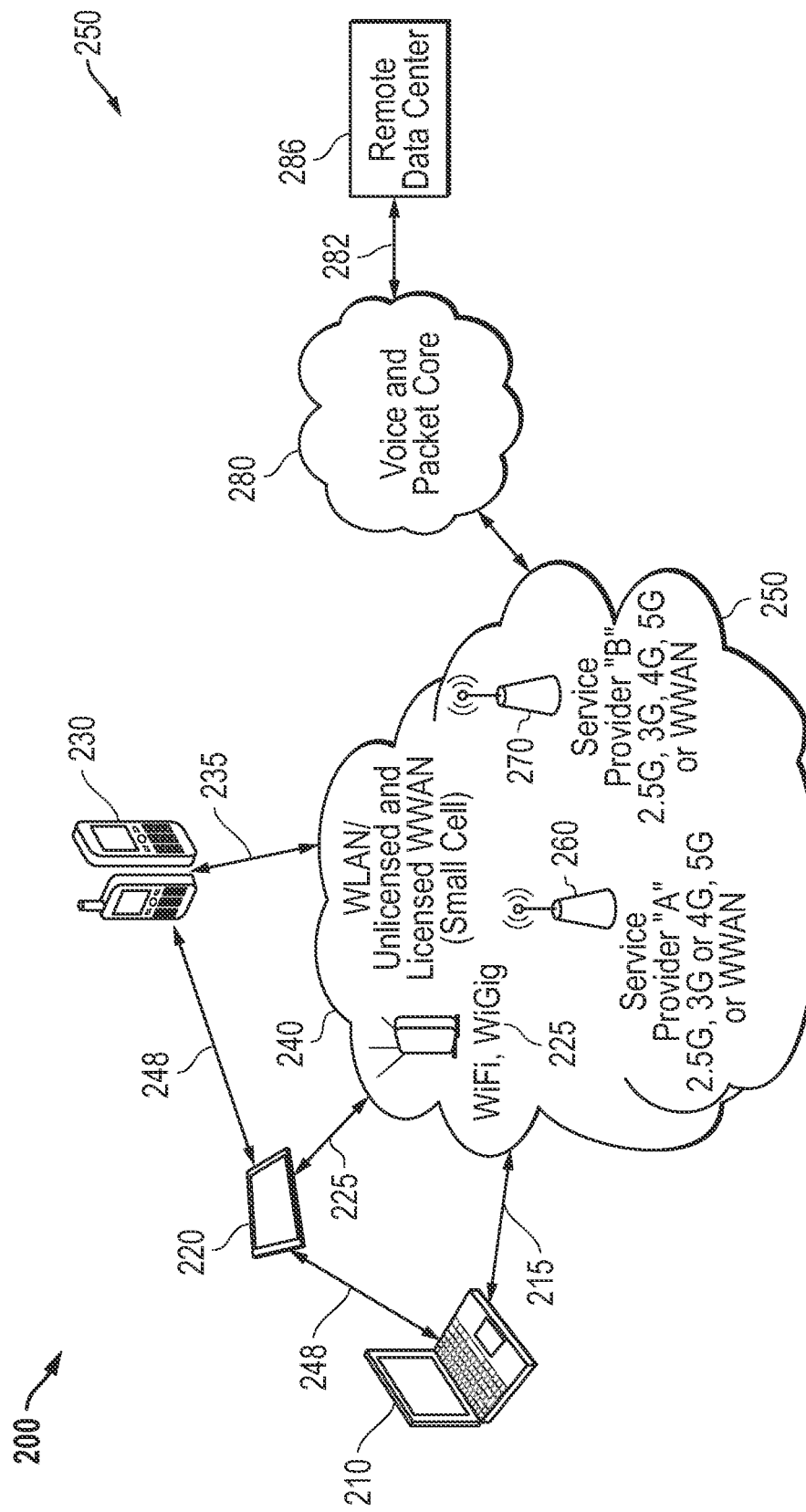
FIG. 2 is a block diagram of a network environment offering several communication protocol options and mobile information handling systems according to an embodiment of the present disclosure.

FIG. 2 illustrates a network 200 that can include one or more information handling systems 210, 220, 230. In a particular embodiment, network 200 includes networked mobile information handling systems 210, 220, and 230, wireless network access points, and multiple wireless connection link options. Wireless network access points may include WLAN access points 255 such as Wi-Fi or WiGig access points or small cell cellular access points such as gNodeB or eNodeB small cell access points or base station cellular access towers 260 or 270. A variety of additional computing resources of network 200 may include client mobile information handling systems, data processing servers, network storage devices, local and wide area networks, or other resources as needed or desired. As partially depicted, systems 210, 220, and 230 may be a laptop computer, tablet computer, 360-degree convertible systems, wearable computing devices, or a smart phone device. These mobile information handling systems 210, 220, and 230, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option such as gNodeB small cell access points for 5G technologies.

Since WPAN or Wi-Fi Direct Connection 248 and WWAN networks can functionally operate similar to WLANs, they may be considered as wireless local area networks (WLANs) for some purposes herein. Components of a WLAN may be connected by wireline or Ethernet connections to a wider external network. For example, wireless network access points may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, IEEE 802.11, IEEE 1914/1904, IEEE P2413/1471/42010, or 5G small cell WWAN communications such as gNodeB, 4G eNode B, or similar wireless network protocols. Alternatively, other available wireless links within network 200 may include macro-cellular connections 250 via one or more service providers 260 and 270. Service provider macro-cellular connections may include 2G standards such as GSM, 2.5G standards such as GSM EDGE and GPRS, 3G standards such as W-CDMA/UMTS and CDMA 2000, 4G standards, or 5G standards including WiMAX, LTE, and LTE Advanced, LTE-LAA, small cell WWAN, and the like. Again, any number of protocols, 5G or otherwise, may be implemented as described herein. The protocols implemented may operate on certain 5G frequencies such as high frequency (HF) bands, very high frequency (VHF) bands, ultra-high frequency (UHF) bands, L band, S band, C band, X band, Ku band, K band, Ka band, V band, W band, and millimeter wave bands, among others. Frequency bands utilized may change for 5G and other protocols depending upon jurisdiction or location of operation of the antenna systems described herein.

Wireless local network 240 and macro-cellular network 250 may include a variety of licensed, unlicensed or shared communication frequency bands as well as a variety of wireless protocol technologies ranging from those operating in macrocells, small cells, picocells, or femtocells.

In some embodiments according to the present disclosure, a networked mobile information handling system 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or plural antennas may be shared on the wireless communication devices. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands, 3.5 GHz conditional shared communication frequency bands under FCC Part 96, or other sub 6 GHz frequency bands that may service 5G communication protocols. Wi-Fi ISM frequency bands that may also be subject to sharing include 2.4 GHz, 60 GHz, 900 MHz or similar bands as understood by those of skill in the art that may operate in harmonic frequency bands on shared antenna systems. Within local portion of wireless network 250 access points for Wi-Fi or WiGig as well as small cell WWAN connectivity may be available in 5G technology. This may create situations where a plurality of antenna systems are operating on a mobile information handling system 210, 220 or 230 via concurrent communication wireless links on both WLAN and WWAN and which may operate within the same, adjacent, and potentially interfering communication frequency bands. Such bands, or harmonic variations thereof, may be transceived on shared antenna systems according to embodiments herein. For example, a shared antenna may be a transmitting and receiving antenna that includes high-band, medium-band, low-band, and unlicensed band transmitting antennas. As described in various embodiments herein, transceiving antennas capable of receiving and transmitting according to various wireless protocols may include a subset of antennas that may be shared according to an antenna controller and one or more RF switches according to embodiments herein. Each of the antennas included in the information handling system 100 in an embodiment may be subject to the FCC regulations on specific absorption rate (SAR).

The voice and packet core network 280 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile information handling systems such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN or small cell WWAN before connecting directly to a mobile information handling system or may connect directly to one or more mobile information handling systems 210, 220, and 230. Alternatively, mobile information handling systems 210, 220, and 230 may connect to the external network via base station locations at service providers such as 260 and 270. These service provider locations may be network connected via backhaul connectivity through the voice and packet core network 280.

Remote data centers may include web servers or resources within a cloud environment that operate via the voice and packet core 280 or other wider internet connectivity. For example, remote data centers can include additional information handling systems, data processing servers, network storage devices, local and wide area networks, or other resources as needed or desired. Having such remote capabilities may permit fewer resources to be maintained at the mobile information handling systems 210, 220, and 230 allowing streamlining and efficiency within those devices. Similarly, remote data center permits fewer resources to be maintained in other parts of network 200.

Although 215, 225, and 235 are shown connecting wireless interface adapters of mobile information handling systems 210, 220, and 230 to wireless networks 240 or 250, a variety of wireless links are contemplated. Wireless communication may link through a wireless access point (Wi-Fi or WiGig), through unlicensed WWAN small cell base stations such as in network 240 or through a service provider tower such as that shown with service provider A 260 or service provider B 270 and in network 250. In other aspects, mobile information handling systems 210, 220, and 230 may communicate intra-device via 248 when one or more of the mobile information handling systems 210, 220, and 230 are set to act as an access point or even potentially an WWAN connection via small cell communication on licensed or unlicensed WWAN connections. For example, one of mobile information handling systems 210, 220, and 230 may serve as a Wi-Fi hotspot in an embodiment. Concurrent wireless links to information handling systems 210, 220, and 230 may be connected via any access points including other mobile information handling systems as illustrated in FIG. 2.

Figure 3:
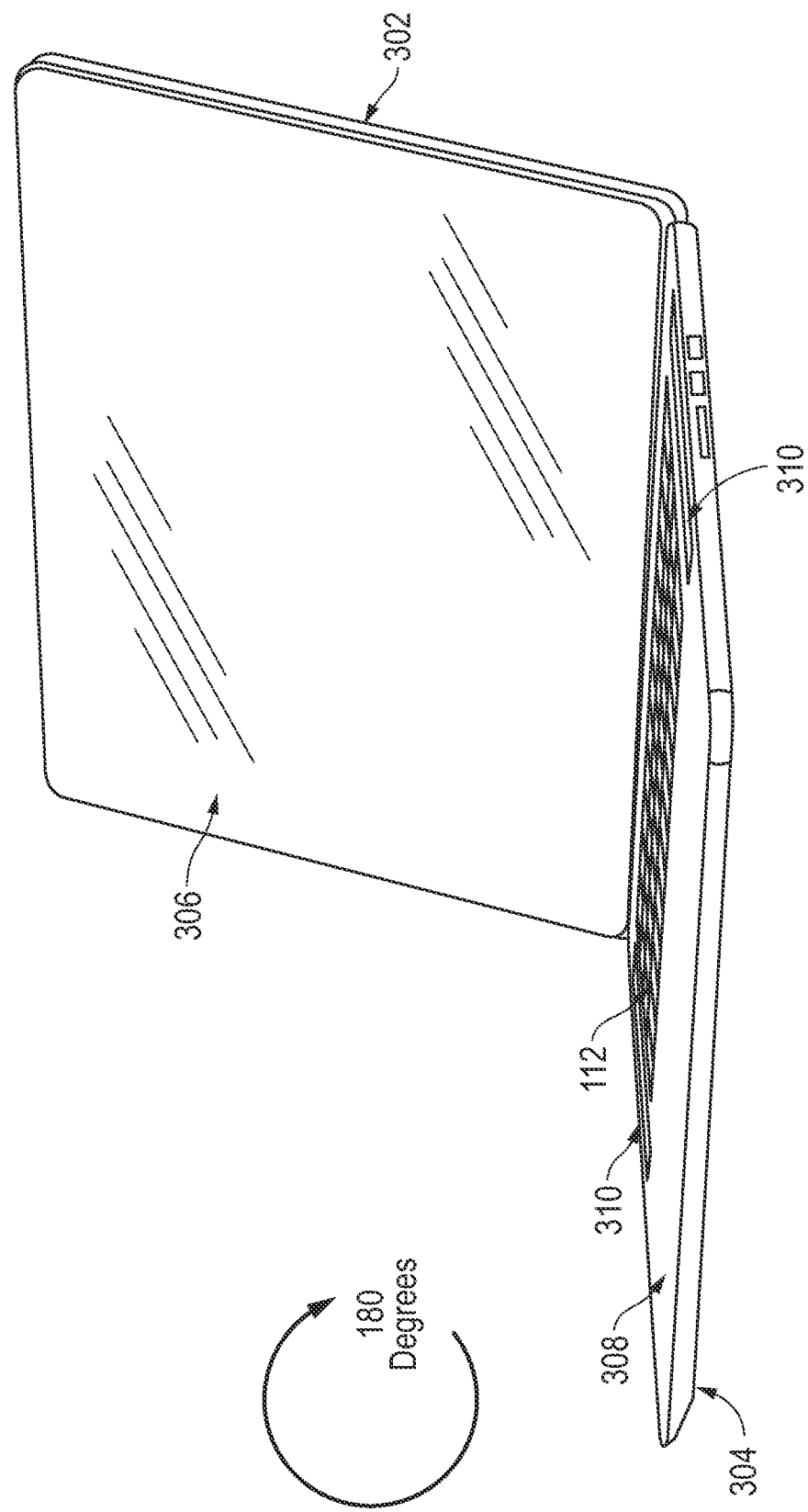
FIG. 3 is a graphical illustration of an information handling system placed in an open configuration according to an embodiment of the present disclosure.

FIG. 3 is a graphical illustration of an information handling system with a metal chassis including a base chassis and display chassis placed in an open configuration according to an embodiment of the present disclosure. The open configuration is shown for illustration purposes. It is understood that a closed configuration would have the lid chassis fully closed onto the base chassis. The metal chassis 300 in an embodiment may comprise an outer metal case or shell of an information handling system such as a tablet device, laptop, or other mobile information handling system. As shown in FIG. 3, the metal chassis 300, in an embodiment, may further include a plurality of chassis or cases. For example, the metal chassis 300 may further include an A-cover 302 functioning to enclose a portion of the information handling system such as a display chassis which may include one or more antenna systems according to an embodiment. As another example, the metal chassis 300, in an embodiment, may further include a D-cover 304 functioning to enclose another portion of the information handling system along with a C-cover 308 which may include a transmitting/receiving antenna according to the embodiments described herein. The C-cover 308 may include, for example, a keyboard, a trackpad, or other input/output (I/O) device. When placed in the closed configuration, the A-cover 302 forms a top outer protective shell, or a portion of a lid for the information handling system, while the D-cover 304 forms a bottom outer protective shell, or a portion of a base. When in the fully closed configuration, the A-cover 302 and the D-cover 304 would be substantially parallel to one another.

In some embodiments, either or both of the A-cover 302 or the D-cover 304 may be comprised of metal restricting locations where antenna systems may be implemented. The B-cover 306 may be a display screen with little or no bezel further restricting location available for antenna placement. Further, multiple RAT are used with such an information handling system such as shown in FIG. 3 requiring accommodation of a greater set of frequency ranges and antennas taking more space and size within the information handling system. In some embodiments, the A-cover 302 and D-cover 304 may include metallic or plastic components. For example, some plastic components that are radio-frequency (RF) transparent may be used to form a portion of the C-cover 308 or D-cover 304 in part however limited portions of plastic may be used for aesthetic reasons. The formation of plural antenna systems may be placed at the A-cover 302 or B-cover 306 or a place for several antenna systems deployed in the base chassis of the C-cover 308 and D-cover 304. With the space within the A-cover 302/B-cover 306 assembly where an antenna may have been placed being eliminated to allow for a relatively larger video display device placed therein in some embodiments, plural antenna elements or slots may be placed within the C-cover 308 and D-cover 304 such that the capabilities of the information handling system may be increased while also increasing user satisfaction during use. In the embodiments, each of several antenna elements for Wi-Fi/Bluetooth® (BT) as well as cellular communications according to embodiments herein may be excited to emit an RF EM wave signal at different frequencies allowing for the ability of the information handling system to communicate on a variety of RATs. As described, some antenna systems may be shared antenna systems according to various embodiments herein.

FIG. 4 is a block diagram of an information handling system with several antenna systems deployed according to existing technology. In the shown example, a central processing unit 402 of a core information handling system may provide data for wireless communications to either of a plurality of radio modules for wireless protocol subsystems available to an information handling system.

As shown in FIG. 4, a Wi-Fi and BT radio module 426 may be a radio module such as a radio card and front end controllers that may be operatively coupled to two antenna elements 471 and 472 to excite the antenna element in order to cause the antenna element to emit one or a plurality of frequencies based on the target frequency or a plurality of target frequencies. One antenna element 471 may be allocated for BT wireless communications or for Wi-Fi wireless communications based on the wireless protocol being utilized at Wi-Fi radio module 426. Such a system may have to alternate use of antenna 471 between Wi-Fi (e.g. at 2.4 GHz) and BT if both are being used. A second antenna element 472 may be allocated for additional Wi-Fi wireless communication such as to accommodate a different frequency band than the first antenna or provide for MIMO 2×2 Wi-Fi capability. As such, two antenna systems 471 and 472 may be operatively coupled to the BT and Wi-Fi radio module 426.

Also shown in FIG. 4, a cellular radio module 427 may be a radio module such as a radio card and front end controllers that may be operatively coupled to four antenna elements 474, 475, 476, and 477 to excite those antenna elements in order to cause the antenna element to emit one or a plurality of frequencies based on the target frequency or a plurality of target frequencies for cellular wireless communications. The four antenna elements 474, 475, 476, and 477 may be allocated for different cellular wireless communication frequency bands or may provide for MIMO 4×4 cellular capability. As such, four antenna systems 474, 475, 476, and 477 may be operatively coupled to the cellular radio module 427 within a cellular RF subsystem.

In the example shown in FIG. 4, six antennas are utilized to support the two different wireless protocol RF subsystems. Two antennas are allocated to the BT and Wi-Fi radio module 426 and four antennas are allocated to the cellular radio module 427. However, during operation of an information handling system, typically most users will utilize one RAT protocol at a time for wireless data communications. For example, a user in an office location may utilize a Wi-Fi RAT while the same user in the field or travelling may utilize LTE cellular RAT for wireless data communications. Thus, one or more of the above antennas or sets of antennas may be under utilized or not utilized at all during typical operation of the information handling system.

FIG. 5 is a block diagram of an information handling system with several antenna systems deployed with a shared antenna system according to an embodiment of the present disclosure. In the shown embodiment, a central processing unit 502 of a core information handling system may provide data for wireless communications to either of a plurality of radio modules for wireless protocol subsystems available to an information handling system.

As shown in FIG. 5, a Wi-Fi and BT radio module 526 may be a radio module such as a radio card and front end controllers that may be operatively coupled to a single antenna element 581 to excite the antenna element in order to cause the antenna element to emit one or a plurality of frequencies based on the target frequency or a plurality of target frequencies such as for BT wireless communications or for Wi-Fi wireless communications based on the wireless protocol being utilized at BT and Wi-Fi radio module 526. Antenna 581 is operatively coupled to an antenna port of the BT and Wi-Fi radio module 526 via a conductive trace, coaxial cable or other conductive connection for providing or receiving wireless excitation via the antenna 581. A second antenna element is not needed in the present embodiment, and the second antenna port of BT and Wi-Fi radio module 526 may be operatively coupled to an RF switch 550. A shared Wi-Fi and cellular antenna 582 may be allocated for additional Wi-Fi wireless communication such as to accommodate a different frequency band than the first antenna 581 or provide for MIMO 2×2 Wi-Fi capability in some circumstances. As such, two antennas 581 and shared antenna 582 may be operatively coupled to the BT and Wi-Fi radio module 526.

RF switch 550 may be operatively coupled to an antenna controller 534 according to an embodiment of the present disclosure via a control line. RF switch 550 may be coupled via the control line between antenna controller 534 for transmitting control signaling to switch the RF switch between the Wi-Fi and BT radio module 526 and a cellular radio module 527. Antenna controller 534 may be part of the wireless interface adapter and in communication with the BT and Wi-Fi radio module 526 for information exchange relating to status of Wi-Fi wireless link availability, quality, or other metrics as described in embodiments herein as well as link status of other wireless protocols available to the information handling system. Antenna controller 534 may also be in communication with the cellular radio module 527 for information exchange relating to wireless link availability, quality, or other metrics as described in embodiments herein as well as link status of other wireless protocol availability, such as Wi-Fi availability, to the information handling system. RF switch 550, in an example embodiment, may be a single pole, dual throw (SPDT) RF switch in an example embodiment. Other RF switch options are also contemplated. The RF switch 550 may be mounted to a motherboard or radio card printed circuit board, with traces to shared antenna 582 and BT and Wi-Fi radio module 526 and cellular radio module 527 to reduce noise and interference in some embodiments.

Also shown in FIG. 5, the cellular radio module 527 may be a radio module such as a radio card and front end controllers that may be operatively coupled to four antenna elements 582, 583, 584, and 585 to excite those antenna elements in order to cause the antenna element to emit one or a plurality of frequencies based on the target frequency or a plurality of target frequencies for cellular wireless communications. One element 582 of the four antenna elements 582, 583, 584, and 585 may be allocated as a shared antenna element and operatively connected via a conductive trace, coaxial cable, or other conductor to RF switch 550 as described above. When RF switch 550 is switched to the cellular radio module 527, the four antennas 582, 583, 584, and 585 may be utilized for different cellular wireless communication frequency bands or may provide for MIMO 4×4 cellular capability. As such, four antenna systems 582, 583, 584, and 585 may be operatively coupled to the cellular radio module 527 within a cellular RF subsystem in such an embodiment. If Wi-Fi wireless protocol is prioritized in an embodiment such that shared antenna 582 is allocated by the RF switch 550 to operate with BT and Wi-Fi radio module 526, antennas 584 and 585 (or 583) may still be utilized to provide for cellular wireless data communications, such as 2×2 MIMO cellular data communications, via the cellular radio module 527. A determination of which wireless protocol available has priority may be made in accordance with embodiments of the operation of the antenna controller 534 and information received from the BT and Wi-Fi radio module 526 and cellular radio module 527 as described herein.

In the example embodiment shown in FIG. 5, five antennas need only be deployed and are utilized to support the two different wireless protocol RF subsystems based on the control determination at the antenna controller 534. One antenna 581 is allocated to the BT and Wi-Fi radio module 526 and a second, shared antenna 582 may be switched via the RF switch 550 to provide for Wi-Fi data communication connectivity. Four antennas 582, 583, 584, and 585, including shared antenna 581, may be allocated to the cellular radio module 527 to provide either 2×2 cellular wireless access or 4×4 cellular wireless access depending on the antenna controller 534. Since, during operation of an information handling system most users will typically utilize one RAT protocol at a time for wireless data communications, the shared antenna 581 may be toggled between competing RAT protocols depending on the status or availability reported of each RAT capability by the BT and Wi-Fi radio module 526 and cellular radio module 527. For example, a user in an office location may be determined to have strong Wi-Fi availability and utilize a Wi-Fi RAT at a 2×2 arrangement with antennas 581 and 582 while antennas 584 and 585 may still provide 2×2 cellular connectivity in one example embodiment. In another example embodiment, a user in the field or travelling may utilize LTE cellular RAT for wireless data communications and a 4×4 cellular connectivity may be selected via antennas 582, 583, 584, and 585 leaving BT (and Wi-Fi) capability via antenna 581. Thus, the above antennas or sets of antennas may be more productively utilized and fewer antennas need deployment on the information handling system typical operation.

Figures 6, 7:
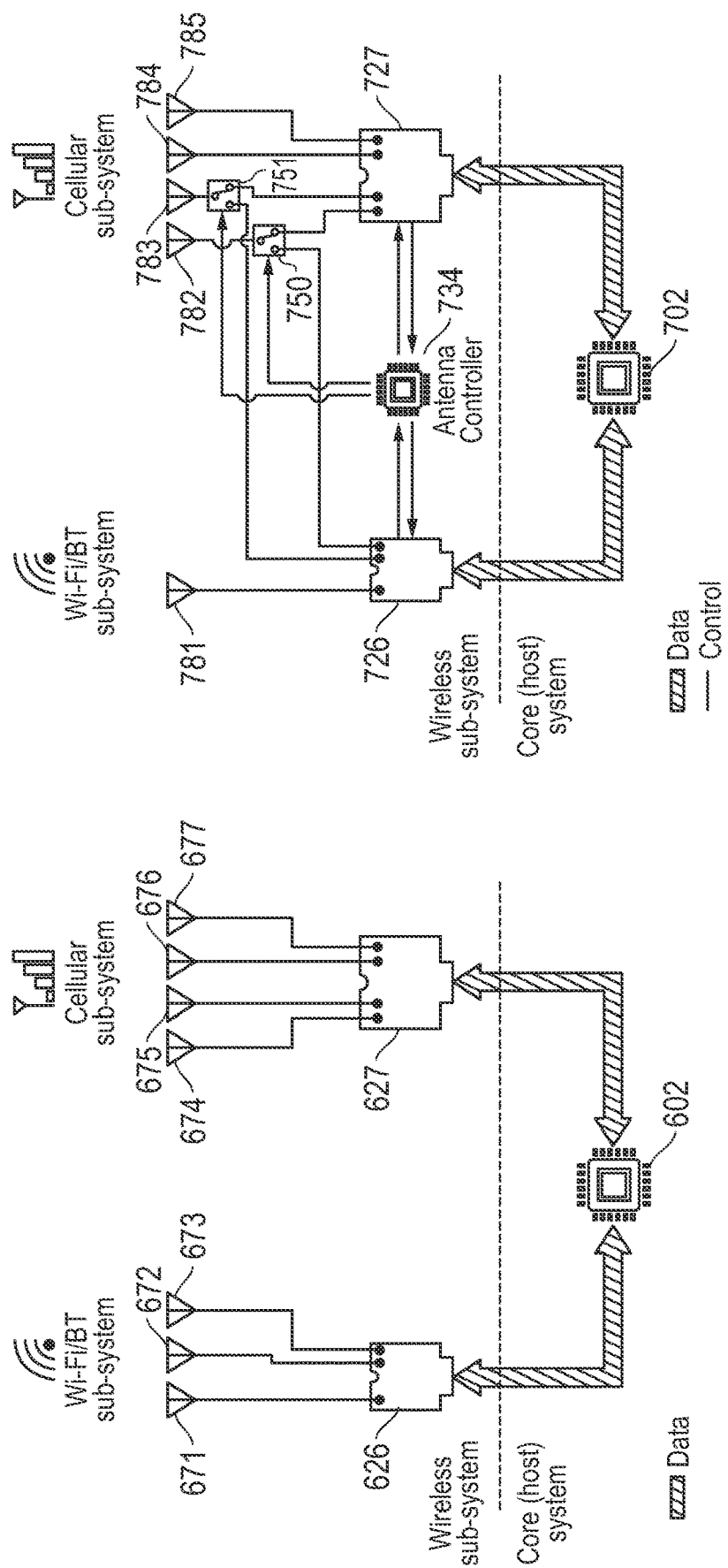
FIG. 6 is a block diagram of plural antennas and wireless sub-systems according to a prior art layout design.
FIG. 7 is a block diagram of plural antennas, antenna controller, and wireless sub-systems according to another embodiment of the present disclosure.

FIG. 6 is a block diagram of an information handling system with several antenna systems deployed according to existing technology. In the shown example, a central processing unit 602 of a core information handling system may provide data for wireless communications to either of a plurality of radio modules for wireless protocol subsystems available to an information handling system.

As shown in FIG. 6, a Wi-Fi and BT radio module 626 may be a radio module such as a radio card and front end controllers that may be operatively coupled to three antenna elements 671, 672 and 673 to excite the antenna element in order to cause the antenna element to emit one or a plurality of frequencies based on the target frequency or a plurality of target frequencies for either BT or Wi-Fi technology. A first antenna element 671 may be allocated for BT and Bluetooth® Low Energy (BLE) wireless communications. A second antenna 672 may be allocated for Wi-Fi scanning and Wi-Fi wireless communications based on the wireless protocol being utilized at Wi-Fi radio module 626. A third antenna element 673 may be allocated for additional Wi-Fi wireless communication such as to accommodate a different frequency band than the first antenna or provide for MIMO 2×2 Wi-Fi capability. As such, three antenna systems 671, 672 and 673 may be operatively coupled to the BT and Wi-Fi radio module 626 at antenna ports. Such a system may thus have dedicated antenna ports for concurrent use of antenna 671, for BT for example, and Wi-Fi (e.g. at 2.4 GHz) on antennas 672 and 673 in an example embodiment when both are being used.

Also shown in FIG. 6, a cellular radio module 627 may be a radio module such as a radio card and front end controllers that may be operatively coupled to four antenna elements 674, 675, 676, and 677 to excite those antenna elements in order to cause the antenna element to emit one or a plurality of frequencies based on the target frequency or a plurality of target frequencies for cellular wireless communications. The four antenna elements 674, 675, 676, and 677 may be allocated for different cellular wireless communication frequency bands or may provide for MIMO 4×4 cellular capability. As such, four antenna systems 674, 675, 676, and 677 may be operatively coupled to the cellular radio module 627 within a cellular RF subsystem.

In the example shown in FIG. 6, seven antennas are utilized to support the different wireless protocol RF subsystems and must be deployed within the information handling system. One antenna 671 is allocated to BT/BLE, two antennas 672 and 673 are allocated to the Wi-Fi radio module 626, and four antennas 674, 675, 676, and 677 are allocated to the cellular radio module 627. However, as described above, typically during operation of an information handling system most users will utilize one RAT protocol at a time for wireless data communications. For example, a user in an office location may utilize a Wi-Fi RAT while the same user in the field or travelling may utilize LTE cellular RAT for wireless data communications. However, BT wireless usage may be in conjunction with another radio technology for short range peripheral operations in conjunction to wireless data communications. Thus, one or more of the above antennas or sets of antennas may be under-utilized or not utilized at all during typical operation of the information handling system for data communications, although a dedicated antenna may be used for a BT wireless protocol.

FIG. 7 is a block diagram of an information handling system with several antenna systems deployed with a plurality of shared antenna systems according to another embodiment of the present disclosure. It is understood that any number of antennas may be shared in some embodiments. In the shown embodiment, a central processing unit 702 of a core information handling system may provide data for wireless communications to either of a plurality of radio modules for wireless protocol subsystems available to an information handling system.

As shown in FIG. 7, a Wi-Fi and BT radio module 726 may be a radio module such as a radio card and front end controllers that may be operatively coupled to a single antenna element 781 to excite the antenna element in order to cause the antenna element to emit one or a plurality of frequencies based on the target frequency or a plurality of target frequencies such as for BT wireless communications or for Wi-Fi scan for wireless communications based on the wireless protocol being utilized at BT and Wi-Fi radio module 726. Antenna 781 is operatively coupled to an antenna port of the BT and Wi-Fi radio module 726 via a conductive trace, coaxial cable or other conductive connection for providing or receiving wireless excitation via the antenna 781. A second or third separate antenna element is not needed in the present embodiment, and the second antenna port and third antenna ports of the BT and Wi-Fi radio module 726 may be operatively coupled to a first RF switch 750 and a second RF switch 751 respectively. Shared Wi-Fi and cellular antennas 782 and 783 may be allocated for additional Wi-Fi wireless communication such as to accommodate a different frequency band than the first antenna 781 or provide for MIMO 2×2 Wi-Fi capability in some circumstances. As such, antenna 781 and shared antennas 782 and 783 may be operatively coupled to the BT and Wi-Fi radio module 726.

A first RF switch 750 may be operatively coupled to an antenna controller 734 according to an embodiment of the present disclosure. A second RF switch 751 may also be operatively coupled to an antenna controller 734 according to another embodiment of the present disclosure. First and second RF switches 750 and 751 may be coupled via control lines between antenna controller 734 for transmitting control signaling to switch one or both of the RF switches between the Wi-Fi and BT radio module 726 and a cellular radio module 727. First RF switch 750 may operatively couple antenna element 782 to either the Wi-Fi and BT radio module 726 or the cellular radio module 727. Second RF switch 751 may operatively couple antenna element 783 to either the Wi-Fi and BT radio module 726 or the cellular radio module 727. Antenna controller 734 may be part of the wireless interface adapter and in communication with the BT and Wi-Fi radio module 726 for information exchange relating to status of Wi-Fi wireless link availability, quality, or other metrics as described in embodiments herein as well as link status of other wireless protocols available to the information handling system. Antenna controller 734 may also be in communication with the cellular radio module 727 for information exchange relating to wireless link availability, quality, or other metrics as described in embodiments herein as well as link status of other wireless protocol availability, such as Wi-Fi availability, to the information handling system. RF switches 750 or 751, in an example embodiment, may be single pole, dual throw (SPDT) RF switches in an example embodiment. Other RF switch options are also contemplated. The RF switches 750 or 751 may be mounted to a motherboard or radio card printed circuit board, with traces to shared antennas 782 and 783 respectively as well as to BT and Wi-Fi radio module 726 and cellular radio module 727 to reduce noise and interference in some embodiments.

Also shown in FIG. 7, the cellular radio module 727 may be a radio module such as a radio card and front end controllers that may be operatively coupled to four antenna elements 782, 783, 784, and 785 to excite those antenna elements in order to cause the antenna element to emit one or a plurality of frequencies based on the target frequency or a plurality of target frequencies for cellular wireless communications. Two elements 782, 783 of the four antenna elements 782, 783, 784, and 785 may be allocated as a shared antenna element and operatively connected via a conductive trace, coaxial cable, or other conductor to RF switches 750 and 751 as described above. When RF switches 750 or 751 are switched to the cellular radio module 727, the four antennas 782, 783, 784, and 785 may be utilized for different cellular wireless communication frequency bands or may provide for MIMO 4×4 cellular capability. As such, four antenna systems 782, 783, 784, and 785 may be operatively coupled to the cellular radio module 727 within a cellular RF subsystem in such an embodiment. If Wi-Fi wireless protocol is prioritized in an embodiment such that shared antennas 782 or 783 are allocated by the RF switches 750 or 751 to operate with the BT and Wi-Fi radio module 726, antennas 784 and 785 may still be utilized to provide for cellular wireless data communications, such as 2×2 MIMO cellular data communications, via the cellular radio module 727. A determination of which wireless protocol available has priority may be made in accordance with embodiments of the operation of the antenna controller 734 and information received from the BT and Wi-Fi radio module 726 and cellular radio module 727 as described herein.

In the example embodiment shown in FIG. 7, five antennas need only be deployed and are utilized to support the two different wireless protocol RF subsystems with three antenna ports each based on the control determination at the antenna controller 734. One antenna 781 is allocated to the BT and Wi-Fi radio module 726 and may provide independent BT support. Antenna 781 may also support Wi-Fi scan operations in an example embodiment. Shared antennas 782 and 783 may be switched via the RF switches 750 or 751 to provide for Wi-Fi data communication connectivity. This may include support for 2×2 MIMO Wi-Fi data communications. Four antennas 782, 783, 784, and 785, including shared antennas 781 and 782 in some embodiments, may be allocated to the cellular radio module 727 to provide either 2×2 cellular wireless access or 4×4 cellular wireless access depending on the antenna controller 734. Since, during operation of an information handling system most users will typically utilize one RAT protocol at a time for wireless data communications, the shared antennas 781 and 782 may be toggled between competing RAT protocols depending on the status or availability reported of each RAT capability by the BT and Wi-Fi radio module 726 and cellular radio module 727. For example, a user in an office location may be determined to have strong Wi-Fi availability and utilize a Wi-Fi RAT at a 2×2 arrangement with antennas 782 and 783 while antennas 784 and 785 may still provide 2×2 cellular connectivity in one example embodiment. In another example embodiment, a user in the field or travelling may utilize LTE cellular RAT for wireless data communications and a 4×4 cellular connectivity may be selected via antennas 782, 783, 784, and 785 leaving BT (and Wi-Fi scan) capability via antenna 781. Thus, the above antennas or sets of antennas may be more productively utilized and fewer antennas need deployment on the information handling system typical operation.

Figure 8:
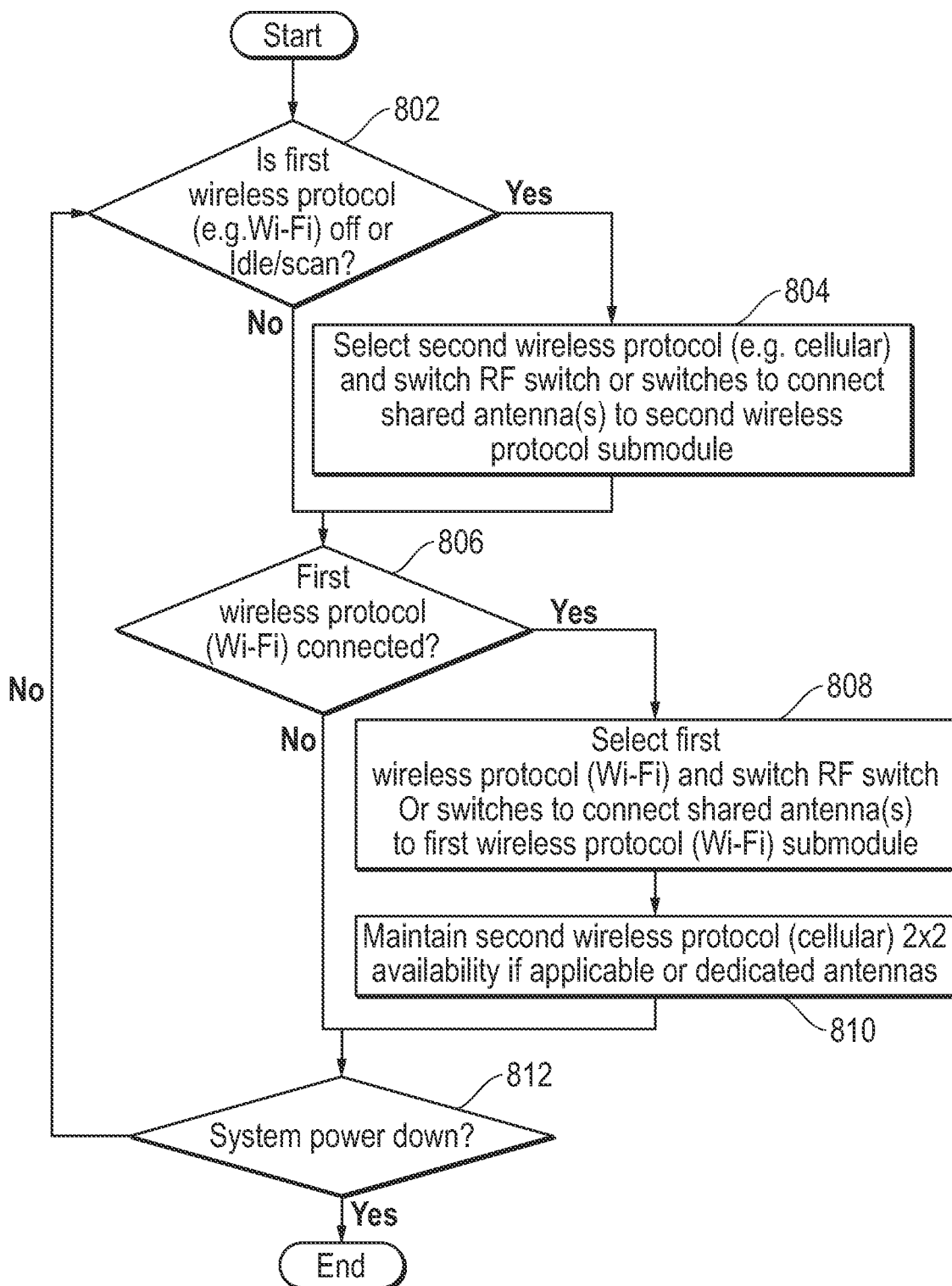
FIG. 8 is a flow diagram illustrating a method for operating an information handling system and antenna controller according to an embodiment of the present disclosure.

FIG. 8 is a flow diagram illustrating a method for operating an information handling system and antenna controller according to an embodiment of the present disclosure. The method may include, at a wireless interface adapter, executing, at block 802, instructions to determine if a first type of wireless protocol system and data communications signal from an antenna system is available or operating. In the embodiments presented herein, the first wireless radio module of the RF subsystem, such as a BT and Wi-Fi RF subsystem may provide information data to an antenna controller on the wireless interface adapter system indicating status of the Wi-Fi system operation. Status may include whether Wi-Fi wireless links are active or are available or whether the Wi-Fi subsystem is idle or off in example embodiments. Additional information provided to the antenna controller by the BT and Wi-Fi radio module at block 802 may include data relating to whether the Wi-Fi protocol subsystem scanning has yielded data that a Wi-Fi access point is available. Further information provided to the antenna controller by the BT and Wi-Fi radio module may include data relating to radio conditions of existing or potential Wi-Fi wireless links. Data such as connection state (off, idle, scanning, connected, etc.), SNR (Signal to noise ratio), channel quality metrics, AP loading, channel number (frequency), bandwidth (BW), MCS, RSSI, and other radio parameters can be retrieved from the Wi-Fi/BT radio module by the antenna controller among other types of data in example embodiments.

At block 802, the antenna controller may determine whether the first wireless protocol subsystem is off or in idle/scan mode in an embodiment. In an example embodiment, the first wireless protocol may be selected as having higher priority. The selection of which wireless protocol has the higher priority is selectable according to an algorithm where an IT manager or a user may determine which wireless protocol may take priority on the shared antennas and the antenna controller may switch RF switches accordingly. In a particular embodiment, the higher priority may be selected for operation of the Wi-Fi subsystem. For example, the antenna controller may determine whether a Wi-Fi subsystem is off or in idle/scan mode. If so, flow may proceed to block 804 to switch to a second wireless protocol subsystem. In an example embodiment, the antenna controller may select a cellular RF radio at block 804 as described in embodiments herein. If at block 802, Wi-Fi is not off or in idle/scan mode, flow may then proceed to block 806 to determine if Wi-Fi is connected, enabled, or with sufficient signal strength and accessibility to be enabled (automatically or suggested to a user, for example) as discussed below. In the shown embodiment, the Wi-Fi subsystem may have been designated as a priority wireless protocol. However, this may not be necessarily the case in all embodiments. The switching algorithm implemented in the antenna controller to determine when to switch RF switch or switches for utilization of shared antennas also can have set priority for either radio subsystem, for example between Wi-Fi or cellular that may be designated as most important. This priority can be pre-defined (hard coded) or be received from a host side IT manager or determined by a user of the information handling system. So, in an example embodiment, if cellular always have priority over Wi-Fi then the switching behavior may start with cellular as a default selection and the shown switching algorithm would be slightly different as understood by those of skill in the art. Different priority and switching will lead to different bandwidths possible for the different subsystems between the cellular subsystem and Wi-Fi subsystem in such an embodiment. For example, block 802 may determine whether cellular is off or unavailable and then, if available, the antenna controller may select cellular for all shared antennas at block 804 in an embodiment where cellular is prioritized. If not available, then flow may proceed to see if Wi-Fi is connected at block 806.

At block 804, the antenna controller will receive data information from a first wireless protocol radio module and a second wireless protocol radio module regarding state information of each wireless protocol in embodiments herein. For example, the antenna controller will receive data information from the BT and Wi-Fi radio module and the cellular radio module in an example embodiment regarding state information of each of the Wi-Fi wireless protocol subsystem and the cellular wireless protocol subsystem. In an example embodiment, if the first wireless protocol subsystem, for example the Wi-Fi subsystem, is off or in idle/scan mode, then the antenna controller may send a command to one or more RF switches to engage shared antennas with the second radio module to support data communications under the second wireless protocol; for example, cellular wireless data communications. In some embodiments, the antenna controller may make an assessment of the strength, quality, availability, or automatic connection capability to a detected first wireless protocol access point or access points. For example, if a Wi-Fi access point is not available or is scanned and has an insufficient signal strength, bandwidth or other metrics, the antenna controller may switch one or more RF switches to engage one or more shared antennas with a cellular radio for support of greater bandwidth with cellular access points. In yet another embodiment, the antenna controller may determine relative signal strengths, bandwidth, signal quality, or other factors as compared between the first wireless protocol (e.g., Wi-Fi) and a second wireless protocol (e.g., cellular) before selecting to switch RF switches to the second wireless protocol at block 804.

Upon sending an instruction to throw one or more RF switches to engage the shared antenna or antennas with the second wireless protocol radio (e.g., with a cellular radio), the antenna controller may provide information data to the BT and Wi-Fi radio module and the cellular radio module to indicate that the shared antenna or antennas are allocated to the second wireless protocol radio in an embodiment. For example, if the antenna controller sends an instruction to throw one or more RF switches to engage the shared antenna or antennas with the cellular radio module, then the antenna controller may provide a status instruction to the cellular radio module indicating that it has made those antennas available in such an embodiment. The cellular subsystem may then utilize such antennas for additional radio frequency bands or for 4×4 added MIMO bandwidth capacity by the cellular radio module in an embodiment. Similarly, the BT and Wi-Fi radio module may be notified by the antenna controller that only one antenna is available for Wi-Fi scanning at the time the RF switch or switches have been switched to operatively couple the shared antenna or antennas with the cellular radio module at block 804 in another embodiment. The BT and Wi-Fi radio module may then adjust its operation accordingly to utilize the dedicated antenna for Wi-Fi scanning operations as appropriate. Once the RF switch or switches are thrown to operatively couple the shared antenna or antennas with the second wireless protocol radio module (e.g., cellular radio module), the flow may proceed to block 806 where the antenna controller may monitor for connection of the first wireless protocol, such as connection of a Wi-Fi protocol according to an embodiment described herein.

At block 806, the antenna controller may monitor whether a first wireless protocol is connected, such as a Wi-Fi protocol, under one of the wireless subsystems. This monitoring may be continuous or periodic to see if the first wireless protocol is available or is engaged at any time during operation of the information handling system. The antenna controller may be in periodic communication with the wireless protocol radio modules and subsystems to determine any change in status.

If the antenna controller receives indication that the first wireless protocol submodule is not selected or engaged for wireless data transmission, then flow may proceed to block 812. The system may maintain the existing arrangement of the RF switch with one or more shared antennas operatively coupled to the second wireless protocol radio module, for example a cellular wireless radio module.

If the antenna controller receives indication that the first wireless protocol submodule is being selected or engaged for wireless data transmission at block 806, then flow may proceed to block 808. In an example embodiment, if the first wireless protocol subsystem (e.g., the Wi-Fi subsystem) indicates to the antenna controller that the user is selecting usage of a first wireless protocol (e.g., Wi-Fi) network connection or one is automatically being engaged when an information handling system enters a range of a first wireless protocol access point, then the method may proceed to block 808 to switch one or more RF switches to engage a shared antenna or antennas with the first wireless protocol subsystem (e.g., the Wi-Fi module subsystem). The antenna controller may notify the first wireless subsystem, such as a Wi-Fi radio module subsystem, that 2×2 MIMO or plural antennas are available to the Wi-Fi radio module for transceiving wireless data in an example embodiment. At block 810, if one or more shared antennas are switched to engage with the first wireless protocol radio module, such as the Wi-Fi radio module, the antenna controller may communicate the change to the second wireless protocol radio module, such as a cellular radio module. In an example embodiment, the second radio module may still have two or three remaining dedicated antennas available and switch to a 2×2 MIMO wireless bandwidth and operation in some example embodiments. Flow may then proceed to block 812.

At block 812, the antenna controller and wireless modules may determine if a system power-down has been selected by a user for the radio systems or the information handling system generally. If not, flow may return to block 802 to determine the state of the first wireless protocol in an embodiment and proceed as before. For example, flow may return to block 802 to determine if the Wi-Fi radio module is off or in idle/scan and not actively transceiving wirelessly. If at block 812, the antenna controller receives indication that the radio system or the information handling system generally is powered down or enters an idle or sleep state, then flow may end.

The blocks of flow diagram of FIG. 8 discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system to wirelessly transmit and receive data comprising:
   a processor and a memory;
   a display device in a display chassis hinged to a base chassis;
   a wireless interface adapter for transceiving wireless communications via radiofrequency (RF) waves having a first wireless protocol subsystem and a second wireless protocol subsystem;
   a plurality of antennas operatively coupled to the wireless interface adapter, including at least a first antenna operatively coupled to the first wireless protocol subsystem, at least a second antenna operatively coupled to the second wireless protocol subsystem, and at least one shared antenna;
   an RF switch configured to operatively switch the at least one shared antenna between the first wireless protocol subsystem and the second wireless protocol subsystem; and
   an antenna controller operatively coupled to the RF switch and configured to send a command to switch the RF switch to operatively couple the at least one shared antenna to the first wireless protocol subsystem when the first wireless protocol subsystem is determined to be active.

2. The information handling system of claim 1, wherein the first antenna and the switched, at least one shared antenna are configured to provide expanded bandwidth for the wireless communications via the first wireless protocol subsystem.

3. The information handling system of claim 1, wherein the second wireless protocol subsystem is operatively coupled to the second antenna and a third antenna to provide wireless communication via the second wireless protocol subsystem.

4. The information handling system of claim 1 further comprising:
   the antenna controller operatively coupled to the first wireless protocol subsystem to receive operational status of the first wireless protocol subsystem.

5. The information handling system of claim 1 further comprising:
   the antenna controller operatively coupled to the RF switch configured to send a command to switch the RF switch to operatively couple the at least one shared antenna to the second wireless protocol subsystem when the first wireless protocol subsystem is determined to be idle.

6. The information handling system of claim 1 further comprising:
   the antenna controller operatively coupled to the second wireless protocol subsystem to receive operational status of the second wireless protocol subsystem.

7. The information handling system of claim 1, wherein the second wireless protocol subsystem is operatively coupled to the shared antenna, the second antenna, a third antenna, and a fourth antenna to provide wireless communication via the second wireless protocol subsystem having expanded bandwidth when the first wireless protocol subsystem is determined to be idle.

8. The information handling system of claim 1, wherein the first wireless protocol subsystem operates wireless transmissions for both a Bluetooth® wireless protocol and a Wi-Fi wireless protocol.

9. An information handling system to wirelessly transmit and receive data comprising:
   a processor and a memory in a base chassis;
   a display device in a display chassis hinged to the base chassis;
   a wireless interface adapter for transceiving wireless communications via radiofrequency (RF) waves having a first wireless protocol subsystem and a second wireless protocol subsystem;
   a plurality of antennas operatively coupled to the wireless interface adapter, including at least a first antenna and a second antenna coupled to the first wireless protocol subsystem, and at least two shared antennas;
   a first RF switch configured to operatively switch a first shared antenna of the at least two shared antennas between the first wireless protocol subsystem and the second wireless protocol subsystem; and
   an antenna controller operatively coupled to the first RF switch and configured to send a command to switch the first RF switch to operatively couple the first shared antenna to the first wireless protocol subsystem when the first wireless protocol subsystem is determined to be active.

10. The information handling system of claim 9 further comprising:
    a third antenna operatively coupled to the first wireless protocol subsystem configured to conduct Bluetooth wireless communications and access point scanning for the first wireless protocol.

11. The information handling system of claim 9 further comprising:
    the antenna controller operatively coupled to a second RF switch configured to send a command to switch the second RF switch to operatively couple a second shared antenna of the at least two shared antennas to the first wireless protocol subsystem when the first wireless protocol subsystem is determined to be active.

12. The information handling system of claim 9, wherein the switched, at least two shared antennas are configured to provide expanded bandwidth for the wireless communications via the first wireless protocol subsystem.

13. The information handling system of claim 9, wherein the second wireless protocol subsystem is operatively coupled to the first antenna and the second antenna to provide wireless communication via the second wireless protocol subsystem at a reduced bandwidth when the first wireless protocol subsystem is switched to operably couple to the at least two shared antennas.

14. The information handling system of claim 9 further comprising:
    the antenna controller operatively coupled to the first RF switch and a second RF switch configured to send commands to switch the first RF switch and the second RF switch to operatively couple the at least two shared antennas to the second wireless protocol subsystem when the first wireless protocol subsystem is determined to be idle.

15. The information handling system of claim 9 further comprising:
    the antenna controller operatively coupled to the first wireless protocol subsystem to receive operational status of the first wireless protocol subsystem.

16. An information handling system to wirelessly transmit and receive data comprising:
    a processor and a memory in a base chassis;
    a display device in a display chassis hinged to the base chassis;

a wireless interface adapter for transceiving wireless communications via radiofrequency (RF) waves having a Wi-Fi wireless protocol subsystem and a 5G wireless protocol subsystem;

a plurality of antennas operatively coupled to the wireless interface adapter, including at least a first antenna operatively coupled to the Wi-Fi protocol subsystem, at least a second antenna operatively coupled to the 5G wireless protocol subsystem, and at least one shared antenna;

an RF switch configured to operatively switch the at least one shared antenna between the Wi-Fi protocol subsystem and the 5G wireless protocol subsystem; and an antenna controller operatively coupled to the RF switch and configured to send a command to switch the RF switch to operatively couple the at least one shared antenna to the Wi-Fi protocol subsystem when the Wi-Fi protocol subsystem is determined to be active.

17. The information handling system of claim 16 further comprising:

the first antenna operatively coupled to the Wi-Fi protocol subsystem configured to conduct Bluetooth wireless communications and access point scanning for the Wi-Fi protocol communications.

18. The information handling system of claim 16 further comprising:

the antenna controller operatively coupled to the Wi-Fi protocol subsystem to receive operational status of the Wi-Fi protocol subsystem.

19. The information handling system of claim 16 further comprising:

a second shared antenna operatively coupled to a second RF switch;

the second RF switch configured to operatively switch the second shared antenna between the Wi-Fi protocol subsystem and the 5G wireless protocol subsystem.

20. The information handling system of claim 16 further comprising:

the antenna controller operatively coupled to the RF switch configured to send a command to switch the RF switch to operatively couple the at least one shared antenna to the 5G wireless protocol subsystem when the Wi-Fi protocol subsystem is determined to be idle.

* * * * *